United States Patent
Imber et al.

(10) Patent No.: US 9,911,200 B2
(45) Date of Patent: Mar. 6, 2018

(54) DETERMINING DIFFUSE IMAGE COMPONENT VALUES FOR USE IN RENDERING AN IMAGE

(71) Applicant: Imagination Technologies Limited, Kings Langley (GB)

(72) Inventors: James Imber, Kings Langley (GB); Adrian Hilton, Surrey (GB); Jean-Yves Guillemaut, Surrey (GB)

(73) Assignee: Imagination Technologies Limited, Kings Langley (GB)

( * ) Notice: Subject to any disclaimer, the term of this patent is extended or adjusted under 35 U.S.C. 154(b) by 450 days.

(21) Appl. No.: 14/544,122

(22) Filed: Nov. 26, 2014

(65) Prior Publication Data
US 2016/0042556 A1    Feb. 11, 2016

(30) Foreign Application Priority Data

Aug. 8, 2014  (GB) .................................. 1414144.4
Oct. 13, 2014 (GB) .................................. 1418090.5

(51) Int. Cl.
*G06T 11/00* (2006.01)
*G06T 7/40* (2017.01)
(Continued)

(52) U.S. Cl.
CPC .............. *G06T 7/408* (2013.01); *G06T 7/507* (2017.01); *G06T 7/90* (2017.01); *G06T 11/001* (2013.01); *G06T 11/60* (2013.01); *G06T 15/04* (2013.01); *G06T 15/06* (2013.01); *G06T 15/10* (2013.01); *G06T 15/50* (2013.01); *G06T 15/80* (2013.01); *G06T 17/00* (2013.01); *G06T 2207/20224* (2013.01); *G06T 2215/16* (2013.01)

(58) Field of Classification Search
CPC ........... G06T 7/408; G06T 7/002; G06T 7/40; G06T 7/90
USPC ........................................................ 345/426
See application file for complete search history.

(56) References Cited

U.S. PATENT DOCUMENTS 6,639,594 B2 * 10/2003 Zhang .................. G06T 15/506
345/426
2009/0052796 A1 * 2/2009 Furukawa ............... G06T 7/596
382/260

OTHER PUBLICATIONS

Zheng, Zuoyong, "Real-Time Rendering for Specular Surface Based on Texture Mapping", Jan. 10, 2011, IEEE, pp. 175-179, [retrieved on Jul. 5, 2017], Retrieved from the Internet <URL:http://ieeexplore.ieee.org/abstract/document/5684981/>.*

(Continued)

*Primary Examiner* — Barry Drennan
*Assistant Examiner* — Terrell Robinson
(74) *Attorney, Agent, or Firm* — Vorys, Sater, Seymour and Pease LLP; Vincent M DeLuca

(57) ABSTRACT

Relightable free-viewpoint rendering allows a novel view of a scene to be rendered and relit based on multiple views of the scene from multiple camera viewpoints. Image values from the multiple camera viewpoints can be separated into diffuse image components and specular image components, such that an intrinsic color component of a relightable texture can be determined for a specular scene, by using the separated diffuse image components. Furthermore, surface normals of geometry in the scene can be refined by constructing a height map based on a conservative component of an initial surface normal field and then determining the refined surface normals based on the constructed height map.

18 Claims, 8 Drawing Sheets
(3 of 8 Drawing Sheet(s) Filed in Color)

(51) Int. Cl.

| | | |
|---|---|---|
| *G06T 7/90* | (2017.01) | |
| *G06T 7/507* | (2017.01) | |
| *G06T 15/04* | (2011.01) | |
| *G06T 15/06* | (2011.01) | |
| *G06T 15/10* | (2011.01) | |
| *G06T 15/50* | (2011.01) | |
| *G06T 11/60* | (2006.01) | |
| *G06T 15/80* | (2011.01) | |
| *G06T 17/00* | (2006.01) | |

(56) References Cited

OTHER PUBLICATIONS

Chen et al "View Interploation for Image Synthesis", Apple Computer Inc. pp. 279-288.
Casas et al "4D Parametric Motion Graphs for Interactive Animation" pp. 1-8.
Carranza et al "Free-Viewpoint Video of Human Actors", MPI Imformatik, pp. 569-577, Saarbruecken, Germany.
Cagniart et al "Iterative Mesh Deformation for Dense Surface Tracking", IEEE 12th International Conference on Computer Vision Workshops, 2009, pp. 1465-1472, Japan.
Buehler et al, "Unstructered Lumigraph Rendering", Proceedings of the 28th annual conference on computergraphics and interactive techniques, 2001, pp. 425-432.
Budd et al, "Global Non-Rigid Alignment of Surface Sequences", Centre for Vision, Speech and Signal Processing, University of Surrey, Guildford, Surrey, Gut 7Xh, UK, pp. 1-17.
Bousseau et al "User-Assited Intrinsic Images" ACM Transactions on Graphics, vol. 28, No. 5, Article 130, Dec. 2009, pp. 130:1-130:10, New York, NY.
Basri et al "Photometric Stereo with General, Unknown Lighting", International Journal of Computer Vision 72(3), 2007, pp. 239-257, USA.
Barrow et al "Recovering Intrinsic Scene Characteristics from Images", Computer Vision Systems, A Hanson and E. Riseman (Eds.) Academic Press, 1978, pp. 3-26, New York.
Kanade et al "Virtulaized Reality: Constructing Virtual Worlds from Real Scenes", IEEE Multimedia, 1997, pp. 34-47.
Zitnick et al "High-quality video view interpolation using a layered representation", Interactive Visual Media Group, Microsoft Research, Redmond, VA, pp. 600-608.
Wu et al High-quality shape from multi-view stereo and shading under general illumination.
Wu et al "Shading-based Dynamic Shape Refinement from Multi-view Video under General Illumination".
Wu et al "Fusing Multiview and Photometric Stereo for 3D Reconstruction under Uncalibrated Illumination", IEEE Transactions of Visualization and Computer Graphics, vol. 17, No. 8, Aug. 2011, pp. 1082-1095.
Volino et al "Optimal Representation of Multi-View Video", Centre for Vision, Speech and Signal Processing, University of Surrey, Guildford, UK, pp. 1-12.
Masayuki Tanimoto "FTC (Free-Viewpoint TV", C.W. Chen et al. (Eds): Intel. Multimedia Communication: Tech. and Appli., SCI 280, pp. 341-365.
Jonathan Richard Shewchuck "Delaunay refinement algorithms for triangular mesh generation", Computational Geometry 22 (2002), pp. 21-74.
Shen et al "Intrisnsic Images Decomposition Using a Local and Global Sparse Representation of Reflectance", Institute for Infocomm Research, pp. 697-704.
Wojciech Matusik "Image-Based Visual Hulls" B.S. Computer Science and Electrical Engineering, University of California at Berkeley, 1997, pp. 1-87.
Levoy et al "Light Field Rendering", Computer Science Department, Stanford University, Proc. ACM SIGGRAPH, 1996, pp. 1-12.
Shen et al "Intrinsic Image Decomposition Using Optimization and User Scribbles", IEEE Transactions on Cybernetics, vol. 43, No. 2, Apr. 2013, pp. 425-436.
Laffont et al "Coherent Intrinsic Images from Photo Collections", ACM Transactions on Graphics 31, 6 (2012). hal-00761123, version 1-5 Dec. 2012.
Kazhdan et al "Poisson Surface Reconstruction", Eurographics Symposium on Geometry Processing, The Eurographics Association (2006).
Imber et al "Intrinsic Textures for Relightable Free-Viewpoint Video", pp. 1-16.
Li et al "Free-viewpoint video relighting from multi-view sequence under general illumination", Machine Vision and Applications, DOI 10.1007/s00138-013-0559-0, published online: Nov. 15, 2013, pp. 1737-1746.
Hernandez et al "Multi-view photometric stereo", pp. 1-16.
Furukawa et al "Carved Visual Hulls for Image-Based Modeling", pp. 1-27.
Eisemann et al "Floating Textures", Technical Report 2007-10-4, Computer Graphics Lab, TU Braunschweig , pp. 1-29.
Durand et al "Fast Bilateral Filtering for the Display of High-Dynamic-Range Images", Laboratory for Computer Science, Massachusetts Institute of Technology.
Debevec et al "Acquiring the Reflectance Field of Human Face", SIGGRAPH 2000 Conference Proceedings, New Orleans, LA, pp. 145-156.
Csakany et al "Recovering Refined Surface Normals for Re-Lighting Clothing in Dynamic Scenes".

\* cited by examiner

DETERMINING DIFFUSE IMAGE COMPONENT VALUES FOR USE IN RENDERING AN IMAGE

BACKGROUND

An image of a scene can be captured from the viewpoint of a camera. In some cases there may be more than one camera capturing different images of a scene. Each image of the scene represents a view of the scene from the viewpoint of the respective camera. However, there will be some viewpoints of the scene which do not correspond to any of the camera viewpoints. The image may be a frame of a video sequence. Techniques such as Free-Viewpoint Video Rendering (FVVR) allow an image representing a novel view of a scene to be generated based on a set of multiple views of the scene from multiple camera viewpoints. The cameras are preferably calibrated and synchronized with each other to facilitate inferring intermediate images of the scene.

Based on the different images of the scene, a model of the scene geometry may be constructed, for example using Multiple-View Stereo (MVS), and a texture may be formed which can be applied to the model. The texture can be formed by projectively texturing the scene geometry with the original images and blending the projected images. The model, with the texture, can then be used to render the scene from a rendering viewpoint which may, or may not, be the same as one of the camera viewpoints. As well as recreating a "real-world" scene from a rendering viewpoint, the content of the real-world scene may be rendered alongside other scene content, either computer generated or real-world.

The term "geometry" is used in the art, and herein, to refer to computer-generated representations of the surfaces of objects in the scene, such that the geometry allows the shape, size and location of objects in the scene to be modelled. The geometry can be textured to thereby apply textures (e.g. defining a colour and other surface detail) to the geometry in order to represent the appearance of objects in the scene. Geometry reconstructed from multiple images of a real scene may be referred to as a "proxy" or "geometric proxy" herein. The geometry is often a triangle mesh, although other representations such as point clouds are possible.

There are a number of issues which may need to be considered when generating a novel viewpoint of a scene, particularly when integrating content into surroundings that differ to those at capture. For example, relighting of the scene can be difficult. Textures extracted from images (e.g. frames of a video sequence) captured by cameras have implicit real-world lighting information, such that lighting artefacts are present (i.e. "baked-in") in the textures.

One way of addressing the problem of how to relight the textures for a novel viewpoint is to control the lighting of the scene at the time when the cameras capture the different views of the scene. For example, diffuse lighting can be used in the initial video capture to avoid creating excess shaded areas and specularities that will damage the plausibility of the scenes rendered using extracted textures. The effects of changes in lighting may be reproduced by estimating the material properties of the textures, for example the intrinsic colour (albedo) and fine detail (surface normals), for subsequent relighting using conventional computer graphics techniques. This may be addressed using an active lighting (or "light-stage") arrangement, in which images of the scene are captured under a variety of calibrated lighting conditions, with material properties of the textures (such as the intrinsic colour, or "albedo", and the fine detail of the surfaces) being fitted to the images. However, the method requires costly apparatus and is generally limited to static scenes. Relighting scenes with arbitrary lighting arrangements is considerably more challenging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining an intrinsic colour component of a relightable texture for a scene which includes specular components, wherein a plurality of images of the scene are captured from a respective plurality of camera viewpoints and projected onto geometry which represents objects in the scene, the method comprising: determining, at each of a plurality of the sample positions of the texture, a diffuse image component value based on the minimum of the image values at the sample position from a set of a plurality of the images; using the diffuse image component values to determine the intrinsic colour component of the relightable texture; and storing the intrinsic colour component of the relightable texture for subsequent use in rendering an image of the scene from a rendering viewpoint under arbitrary lighting conditions.

There is provided an image processing system configured to determine an intrinsic colour component of a relightable texture for a scene which includes specular components, wherein the image processing system is configured to use a plurality of images of the scene captured from a respective plurality of camera viewpoints and projected onto geometry which represents objects in the scene, the image processing system comprising: specularity separation logic configured to determine, at each of a plurality of the sample positions of the texture, a diffuse image component value based on the minimum of the image values at the sample position from a set of a plurality of the images; intrinsic colour component determining logic configured to use the diffuse image component values to determine the intrinsic colour component of the relightable texture; and a store configured to store the intrinsic colour component of the relightable texture for subsequent use in rendering an image of the scene from a rendering viewpoint under arbitrary lighting conditions.

There may be provided computer readable code adapted to perform the steps of the any of the methods described herein when the code is run on a computer. Furthermore, there may be provided computer readable code for generating a processing block configured to perform any of the methods described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples will now be described in detail with reference to the accompanying drawings in which.

Figure 1:
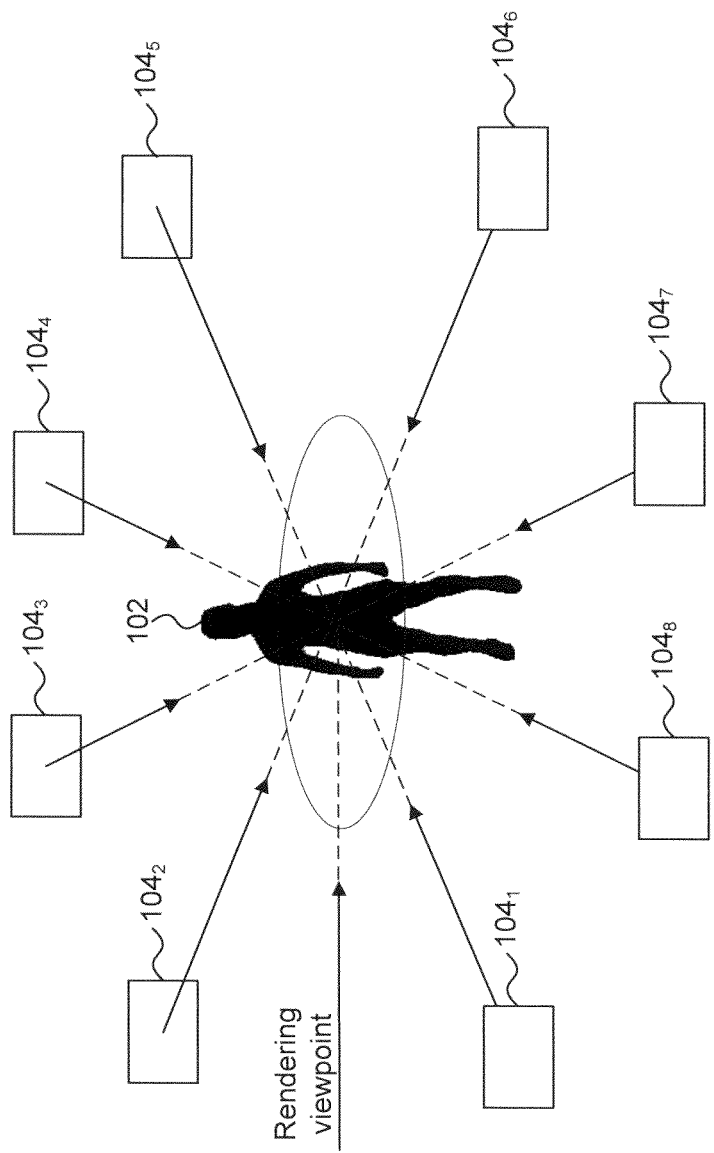
FIG. 1 represents an arrangement in which a plurality of cameras are arranged to capture different images of a scene.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only. The examples described in detail herein relate to free-viewpoint rendering, but the same principles of determining a relightable texture can be applied in other examples, e.g. in which there is only one camera (rather than multiple cameras as in free-viewpoint rendering) which can move to capture multiple views of a scene from different angles, and/or in which the rendering viewpoint is the same as a camera viewpoint.

Free-viewpoint rendering allows an image to be generated to provide a novel view of a scene based on a set of multiple images of the scene from multiple camera viewpoints. As an example, the generated image may be a frame within a generated video sequence. Free-viewpoint video rendering (FVVR) is the synthesis of novel views of a scene that changes with time, with reference to video data captured using a set of cameras. Most standard FVVR systems do not support relighting of the scene. However, examples described herein allow a scene to be relit and viewed under arbitrary lighting conditions when the scene is rendered from the novel viewpoint. For example, this can be used to relight an actor's performance for seamless compositing into arbitrary real-world and/or computer generated surroundings which may have different lighting conditions to those in which the images of the actor are captured. For example, where the images represent a frame of a video sequence the examples described herein relate to "relightable FVVR". The appearance of a scene can be represented as a function of multiple parameters including: (i) the intrinsic colour (which may be referred to as "albedo") of objects in the scene, (ii) the surface normals of the surfaces of objects in the scene, (iii) the specularity of surfaces in the scene, and (iv) the scene lighting. In methods described herein, the appearance of a scene is broken down into estimates of these four parameters, and the colour estimates (i.e. the albedo estimates) and surface normals may be used to subsequently render an image of the scene from a rendering viewpoint under arbitrary lighting conditions. It is not a simple problem to separate the appearance of a scene into the four parameters, in particular if the scene lighting in which the images of the scene are captured is unknown. For example, it is not trivial to determine the difference between a surface that has a bright intrinsic colour but is poorly lit and a surface that is well lit but has a darker intrinsic colour. That is, there is often an ambiguity between shading and albedo.

The ambiguity between shading and albedo is particularly difficult to resolve when the scene includes specular components on the surfaces of objects in the scene caused by the scene lighting. Some of the examples described herein allow specular components of the original images to be separated from diffuse image components. The term "diffuse" is used herein and may be interpreted as meaning "matte" or "non-specular". The diffuse image components (without the specular components) can then be used to solve the ambiguity between shading and albedo. By separating the specular components from the diffuse components, a method adapted for solving the ambiguity between shading and albedo based on a diffuse lighting model (e.g. a Lambertian lighting model) can be used for scenes which have significant specular components, i.e. scenes for which the specular components are not negligible.

Furthermore, some of the examples described herein allow surface normals to be refined such that they better represent physical surfaces. This is achieved by enforcing conservatism of the surface normal field, based on an appreciation that surface normals of physical surfaces of objects represent conservative surface normal fields.

Furthermore, some of the examples described herein provide a method for handling cast shadows in the scene. This allows local occlusion to be taken into account when determining irradiance estimates for the sample positions in the scene. This is achieved by determining an initial estimate of irradiance by ignoring local occlusion, then using that initial irradiance estimate with knowledge of the scene geometry to determine an angle-dependent radiance estimate for the scene. This radiance estimate can then be used with the knowledge of the scene geometry to determine local irradiance estimates at the sample positions within the scene.

FIG. 1 shows an object (e.g. a person 102) which is part of a scene. Eight cameras $104_1$ to $104_8$ are shown in FIG. 1 which are capturing different images of the scene from respective camera viewpoints. However, the system for capturing the images of the scene is not limited to using eight cameras and in other examples a different number of cameras (e.g. fewer than eight or more than eight cameras) may be used to capture images of the scene. In the example shown in FIG. 1 the scene comprises the person 102 in view of all eight of the cameras 104 against a plain (e.g. monochromatic) background. The images captured by the cameras 104 may be frames of a video sequence, but in other examples the cameras capture images of a scene for use in rendering an image at a single point in time, i.e. the rendered image might not be a frame of a video sequence. In this example, the cameras are calibrated with reference to a common coordinate system, and the frames of video captured by each camera 104 are captured at synchronized timings. Furthermore, although not essential, it may simplify the implementation of the image processing system if all of the cameras have the same operating parameters, e.g. the same number of pixels, the same formatting protocol, etc., so that the image data representing the views of the scene can be combined without further steps of converting data captured by one or more of the cameras into a different format. The eight cameras 104 provide eight different camera viewpoints of the scene. However, with the use of FVVR, the scene may be rendered from a rendering viewpoint which might not be the same as any of the camera viewpoints. For example, FIG. 1 shows a rendering viewpoint which is different to all of the eight camera viewpoints. If the cameras are synchronized then each view of the scene is captured by all of the cameras simultaneously. In other examples, it is possible to use unsynchronized cameras but it becomes more difficult to combine the different views of the scene because time, as well as space, becomes a variable that is taken into account in combining the views of the scene.

Figure 5:
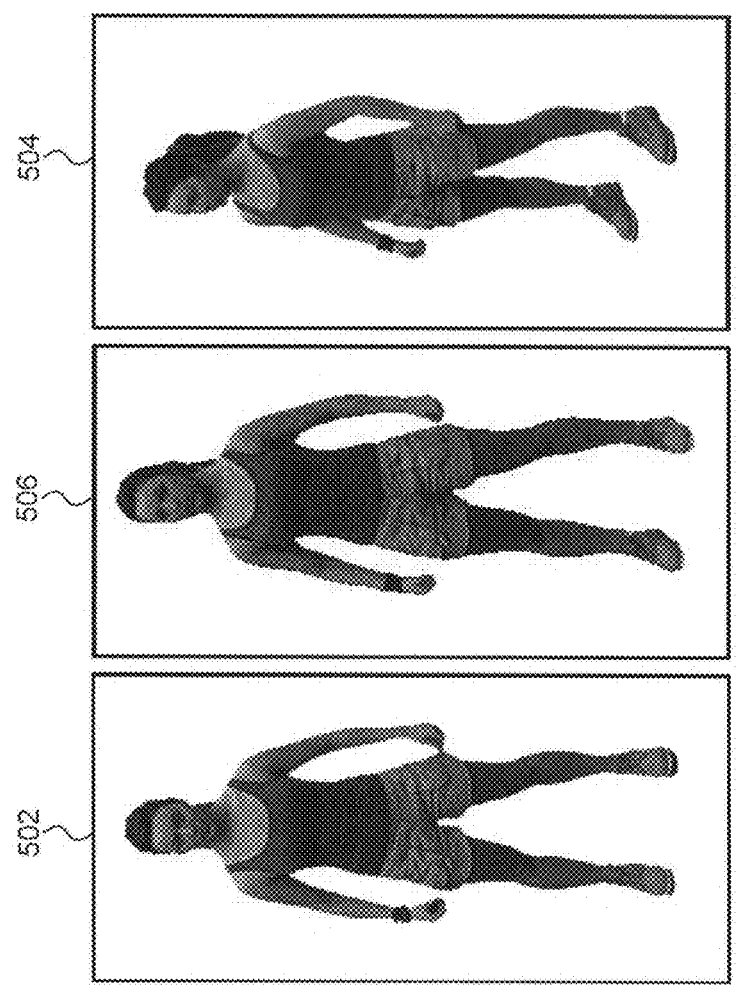
FIG. 5 shows two views of a scene from two camera viewpoints, and shows a rendered image for the scene from a rendering viewpoint.

FIG. 5 shows a first image 502 of the scene taken from the viewpoint of the camera $104_1$. The scene includes the person 102 against the plain background. FIG. 5 also shows a second image 504 of the scene taken from the viewpoint of the camera $104_2$. FIG. 5 also shows a novel view 506 of the scene from the rendering viewpoint which has been rendered according to methods described herein. It can be seen that the rendering viewpoint is between the camera viewpoints of the cameras $104_1$ and $104_2$.

Figure 2:
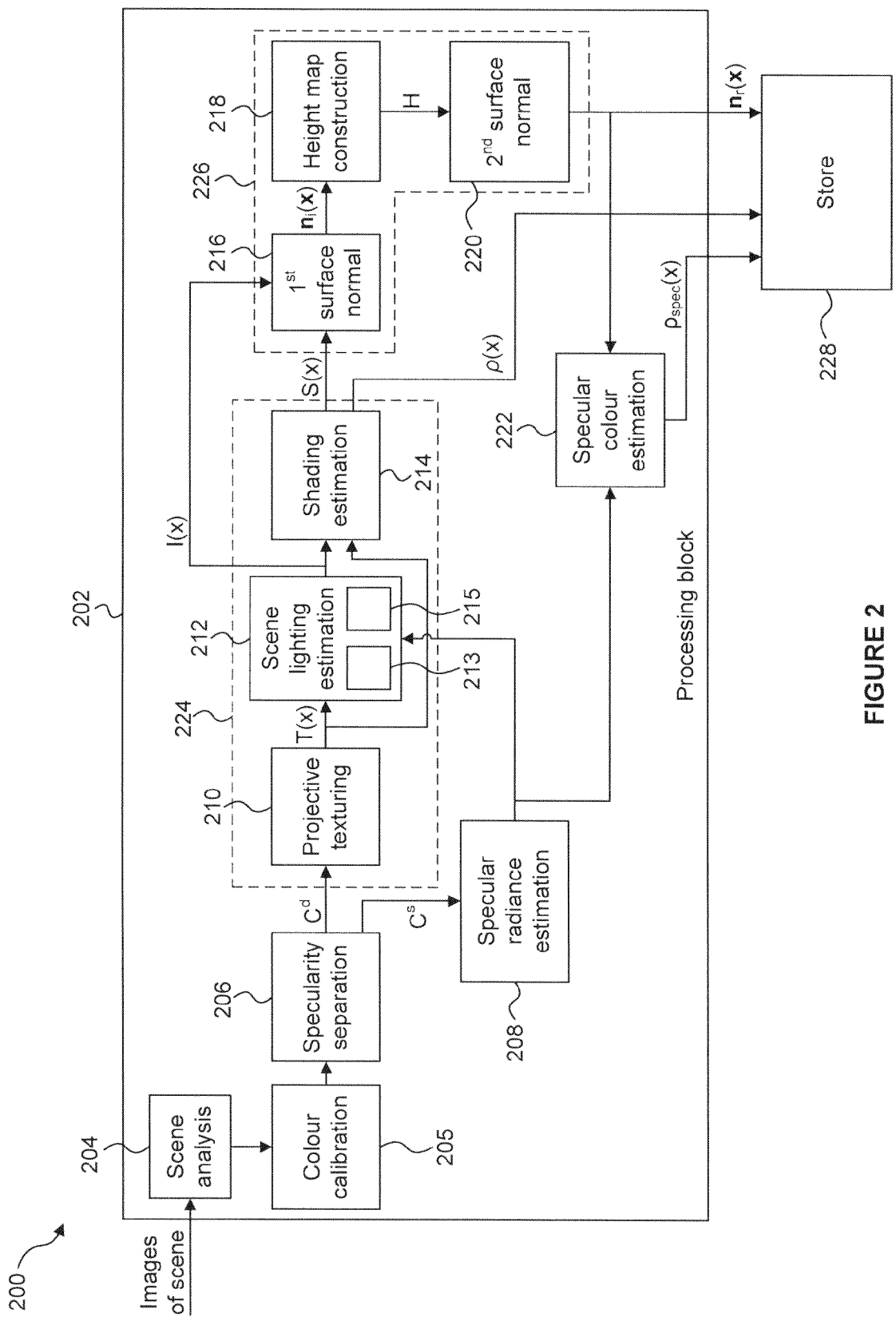
FIG. 2 is a schematic diagram of an image processing system.

FIG. 2 shows an image processing system 200 (e.g. a video processing system in the case that the images are frames of a video sequence) which comprises a processing block 202 and a store 228. The processing block 202 comprises scene analysis logic 204, colour calibration logic 205, specularity separation logic 206, specular radiance estimation logic 208, projective texturing logic 210, scene lighting estimation logic 212, shading estimation logic 214, first surface normal logic 216, height map construction logic 218, second surface normal logic 220 and specular colour estimation logic 222. The scene lighting estimation logic 212 comprises attached shadow processing logic 213 and cast shadow processing logic 215. The combination of the projective texturing logic 210, the scene lighting estimation logic 212 and the shading estimation logic 214 may be considered to be intrinsic colour component determining logic 224 because they act (amongst other functions) to determine an intrinsic colour component of a texture. Furthermore, the combination of the first surface normal logic 216, the height map construction logic 218 and the second surface normal logic 220 may be considered to be surface normal estimation logic 226 because they act to determine surface normal estimates for the surfaces of the scene geometry. It is noted that, in some examples, some of the logic blocks 204 to 226 which are represented separately in FIG. 2 may be combined such that their functionality is not implemented in separate blocks. The logic blocks 204 to 226 may for example be implemented on the processing block 202 in hardware. For example, if a logic block is implemented in hardware it may be formed as a particular arrangement of transistors and other hardware components which is suited for performing the desired function of the logic block. In contrast, the logic blocks 204 to 226 may be implemented by executing software which thereby configures hardware (e.g. general purpose hardware such as a CPU) to implement the functions of the logic blocks 204 to 226 as described herein. The software may comprise a set of computer instructions which can be stored in a memory and can be provided to the processing block 202 for execution thereon, wherein the processing block 202 may be implemented on a processing unit, such as a Central Processing Unit (CPU) or a Graphics Processing Unit (GPU). The processing block 202 is configured to receive data representing the images of the scene from the cameras 104. For example, one of the cameras 104 may, or may not, be implemented in the same device as the image processing system 200. The processing block 202 is configured to process the images of the scene (e.g. using the logic blocks 204 to 226) to determine an intrinsic colour component, $\rho(x)$, of a relightable texture and a set of surface normals $n_r(x)$ for use in rendering an image from the rendering viewpoint under arbitrary lighting conditions. The store 228 may be implemented as a memory for storing the intrinsic colour components of relightable textures and the sets of surface normals.

Figure 3:
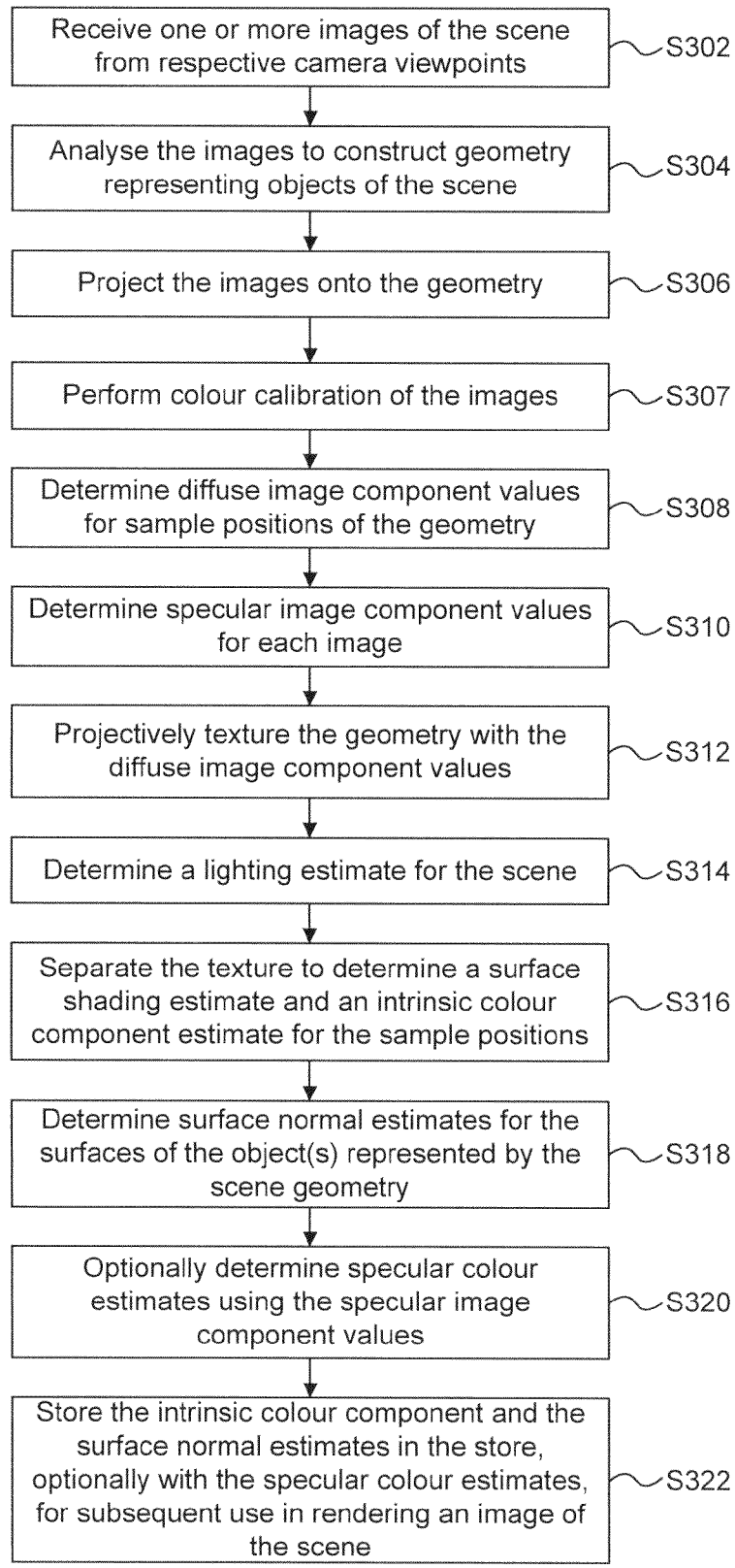
FIG. 3 is a flowchart for a process of determining an intrinsic colour component of a relightable texture and a set of surface normals for use in rendering an image from a rendering viewpoint under arbitrary lighting conditions.

Operation of the image processing system 200 is described with reference to the flow chart shown in FIG. 3. In the examples described in detail herein, the method steps shown in FIG. 3 are performed offline, i.e. before the scene is to be rendered from the rendering viewpoint. In other examples, the method steps shown in FIG. 3 may be performed at runtime, i.e. as the scene is being rendered, but this requires a large amount of processing resources for the render which are usually not available, e.g. on a mobile device. The method steps shown in FIG. 3 may be performed responsive to the images of the scene being captured by the cameras 104. As described in more detail below, a model (or "proxy") of the scene geometry is constructed based on the different images of the scene and an intrinsic colour component of a relightable texture is formed which can be applied to the model. The intrinsic colour component of the relightable texture and a set of surface normals for the scene can then be stored, e.g. in the store 228. Subsequently, at render time, the intrinsic colour component (or "albedo") of the relightable texture and the set of surface normals can be retrieved from the memory and the scene can be rendered from the rendering viewpoint.

The surface normals are used to relight the texture using the lighting conditions that are appropriate for the rendered scene, which may be different to the lighting conditions of the scene when the images were captured by the cameras 104. The estimated surface normals compensate for high-frequency geometry which is missing from an MVS reconstruction. Since in the examples described in detail herein, much of the processing is front-loaded (i.e. performed before the scene is rendered), the processing that is performed during rendering is reduced. The offline steps (i.e. preprocessing steps) performed before the rendering of the scene to determine the intrinsic colour component of the relightable texture and the surface normals representing the scene may be implemented in a computer with substantial available resources, e.g. processing power and memory. The preprocessing steps may take a significant time to complete, e.g. such that each frame may take of the order of tens of minutes (e.g. 20 minutes) to process (including the MVS reconstruction stage). The rendering of the scene from the rendering viewpoint may be implemented on the same device or a different device as that which performed the preprocessing steps. For example, the output from the preprocessing steps (i.e. the intrinsic colour component of the relightable texture and the set of surface normals) may be provided to a rendering device, such as a mobile device for rendering an image from an arbitrary rendering viewpoint under arbitrary lighting conditions. The output from the preprocessing steps may be used to render multiple images for a scene, where each image may be rendered from a different rendering viewpoint and with different lighting conditions. When the image is a frame of a video sequence, and the video is rendered, the video may be output in real-time, with multiple frames (e.g. twenty frames) being processed per second. The processing resources of the rendering device may be limited; this is particularly the case when implementing the renderer on a mobile device for which the processing power and memory capacity may be significantly limited. Since a substantial amount of the processing is performed in the preprocessing steps, the processing performed at the time of rendering is reduced, which can allow a video to be rendered and output in real-time (e.g. at at least approximately 20 frames per second) even on rendering devices such as mobile devices which may have limited resources available.

In step S302 one or more images of the scene are received at the processing block 202 from the cameras 104. In particular, the images of the scene are received at the scene analysis logic 204. The data representing the images of the scene may be provided from the cameras 104 to the processing block 202 via any suitable link, e.g. a wired or wireless link. As mentioned above it may be the case that one of the cameras 104 is implemented in the same device (e.g. a mobile device) as the image processing system 200. Therefore, in some examples, the method may comprise capturing at least one of the images of the scene from a respective at least one of the camera viewpoints, but in other examples, none of the images are actually captured by a camera in the same device in which the image processing system 200 is implemented.

In step S304 the scene analysis logic 204 analyses the images of the scene to construct the geometry representing the object(s) in the scene, thereby determining a model of the scene. There are many ways of constructing the geometry, e.g. a 3D geometric proxy of the scene geometry may be constructed using a Multiple View Stereo (MVS) technique, as is known to those skilled in the art. These processes are generally known as "image-based reconstruction" in the art.

In step S306 the scene analysis logic 204 projects the images from the different camera viewpoints onto the geometry. Methods for projecting the images onto the geometry are known in the art. It will be appreciated that each image of the scene will usually include data for some, but not all, of the surfaces of the objects of the scene geometry onto which that image can be projected. For example, an image of the front of the person 102 may not include any data for projection onto the back of the person 102 in the model of the scene. However, preferably all of the surfaces of the model of the scene are in view of at least one of the cameras 104 such that the combination of views of the scene from the different cameras 104 can be used to project a view onto the whole of the model of the scene.

It can therefore be seen that in steps S304 and S306 the scene analysis logic 204 may perform MVS reconstruction and texture projection. As an example, the use of a wide-baseline capture system favours the use of a visual hull to produce a coarse upper-bound to the scene geometry, which can subsequently be refined by triangulating the positions of features extracted from surface detail. It may be the case that the projected images are not exactly aligned with each other when they are projected onto the scene geometry. This may, for example, be due to slight inaccuracies in the construction of the geometry. Inaccuracies such as these may be detrimental to the specularity removal process which is described below, e.g. the inaccuracies may cause "ghosting" artifacts to appear. Therefore, step S306 may involve warping at least one of the images such that the projected images are better aligned with each other. For example, an optical flow technique is a technique known to those skilled in the art which may be used to warp one or more of the images. That is, in an example, optical flow based projected texture alignment may be used to mitigate errors introduced by coarse MVS reconstruction, allowing the ghosting artefacts to be removed (or at least reduced) for more accurate results.

The images, the model geometry and the textures described herein may each be represented by an array (e.g. a 2D array) of spatially distinct units, x, which can each have one or more values associated with them. As a matter of terminology, these spatially distinct units may be referred to with different terms. That is, the spatially distinct units of an image (in display-space) which is intended to be viewed are referred to herein as "pixels"; the spatially distinct units of a texture (in texture-space) are referred to herein as "texels"; and the spatially distinct units of the model (in the 3D model-space) are referred to herein as "fragments", wherein each fragment corresponds to a "sample position" of a texture applied to a surface of the scene geometry.

Furthermore, in step S307 the colour calibration logic 205 performs colour calibration of the images to better match colour between the images for greater consistency in the resultant texture. It is noted that the cameras 104 which are used to capture the images might not be perfectly calibrated with each other. Therefore, the image values (e.g. colour and intensity) of an image may depend on the camera which has captured the image. A colour calibration process which may be used is based on an assumption that the images values are dominated by diffuse components such that the image values are not strongly dependent on the viewing angle. If this assumption is not valid, then the colour calibration process might not be performed. So using this assumption, the image values projected onto a sample position should be the same (or at least approximately the same).

If there are differences between the image values projected onto the same sample position then the colour calibration process can be used to reduce the differences between the projected images. For example, the colour calibration of the images may involve comparing the image values, $x_i$, for the projected images at the sample positions of the texture and finding a scale parameter, $a_i$, and an offset parameter, $b_i$, for each of the projected images such that differences between calibrated image values, $(a_i x_i + b_i)$, for the different images, i, are minimized. The scale parameter and the offset parameter for an image are the same for all of the sample positions. There might not be a perfect solution, but the best fit for the scale and offset parameters for the images can be found and used to calibrate the images accordingly. This can help to reduce the differences between the different images which can therefore help to reduce errors in the separation of the diffuse and specular components of the images. A colour calibration process such as this is particularly useful if different types of cameras are used to capture the different images, and/or if the quality of the cameras used to the capture the images is not high, e.g. if the camera of a mobile device such as a smartphone or a tablet is used to capture one or more of the images. In these situations, it is likely that the initial images will not be well calibrated with each other, such that the colour calibration process may be particularly useful.

An indication of the scene geometry and the projected image values (i.e. the values of each of the images as projected onto the sample positions of the texture) are provided to the specularity separation logic 206.

In step S308 the specularity separation logic 206 determines, at each of a plurality of the sample positions of the texture, a diffuse image component value based on the minimum of the images values at the sample position from a set of a plurality of the images. This may be achieved in different ways in different examples. For example, for each sample position at which a diffuse image component value is determined, the set of images from which the minimum is found may comprise some or all of the images in which the sample position is visible. The set of images may be formed for each sample position independently. However, it may be beneficial to exclude an image from the set for a sample position if the direction of the viewpoint for the image is significantly different to the surface normal at the sample position. This is because if glancing views of a surface in the scene are used then the image may be "smeared" across the surface, i.e. blurred over a number of sample positions. Smeared projections may corrupt the specularity removal process, so these images are preferably excluded from the set of images from which a minimum image value is found. For example, the set of images for a sample position may include only those images for which an angle between a surface normal at the sample position and a viewing direction of the camera viewpoint for the image is less than a threshold angle, wherein to give some examples, the threshold angle may be 30 degrees, 45 degrees or 60 degrees.

In some examples, just one diffuse image component value may be determined for each of the sample positions of the texture on the surfaces of the geometry. In other examples, such as those described in more detail below, diffuse image component values are determined at sample positions for each of the images which have visibility of the sample positions.

It is noted that specular scenes present a problem to intrinsic image estimation methods, which often use a Lambertian lighting model, which only considers diffuse lighting. However, many real-world scenes have strong specular components which cannot be neglected. The methods described in detail herein separate the specular components of the images from the diffuse components so that the diffuse components can be used in an intrinsic texture estimation method. Specular components are view-dependent, whereas the diffuse components should, by their nature, not be dependent upon the viewing angle. The separated specular and diffuse (or "matte") components can be subsequently processed separately. In some examples, as described below, the specular components can be used in a specular albedo estimation process.

The appearance of a specular surface at a particular sample position x and viewing direction $\omega_0$ can be considered to be a sum of a diffuse image component and a specular image component. For example, as described below, the projected image values may form a texture $T(x, \omega_0)$ which can be given by:

$$T(x,\omega_0)=\rho(x)I(x)+\sigma(x)J(x,\omega_0), \quad (1)$$

where $I(x)$ is the total non-reflected incident energy, i.e. the irradiance at the sample position x, $\rho(x)$ is a diffuse albedo at the sample position x, $\sigma(x)$ is a specular albedo at the sample position x, and $J(x, \omega_0)$ is the strength of reflected light from the sample position x in the direction $\omega_n$. We can say that the first term on the right hand side in equation 1 represents a diffuse image component value $C^d(x)$ at sample position x, and the second term on the right hand side in equation 1 represents a specular image component value, $C^s(x, \omega_0)$ at sample position x and in the direction $\omega_0$.

In the examples in which diffuse image component values are determined for each of the images (assuming accurate colour calibration), for a particular image (which may be referred to as "the reference image"), the diffuse image component value at each of the sample positions may be determined based on the minimum of the image values at the sample position from a set of images comprising the particular image and at least one other image which has visibility of the sample position. For example, the reference image may be captured from a reference camera viewpoint and it may be compared with images captured from camera viewpoints which are the nearest neighbours of the reference camera viewpoint. The nearest neighbours are used because they are likely to have visibility of the same sample positions on the geometry as the reference image, and also because this is likely to reduce the extent to which the different camera viewpoints will have glancing views of the surfaces of the geometry in the scene (which as described above may cause the image to be smeared across the surface). For example, the reference image $C_r(x)$ can be considered to be a sum of diffuse and specular image component values, i.e. $C_r(x)=C_r^d(x)+C_r^s(x)$. The two nearest neighbours to the reference image are $C_a(x)$ and $C_b(X)$. In step S308 the diffuse image component values for the reference image can be found by finding the minimum of the image values $C_r(x)$, $C_a(x)$ and $C_b(x)$ at each of the sample positions, x. That is:

$$C_r^d(x)=\min(C_r(x),C_a(x),C_b(x)) \quad (2)$$

In this way the diffuse image component values of the reference image can be recovered provided the specular highlights do not coincide in all three camera views. It is assumed that the specular highlights do not coincide in all three camera views, and in practice, this is seldom a significant problem especially for models with high-frequency surface detail. This method may be repeated for each of the images (e.g. each of the 8 images captured by the cameras 104) such that diffuse image components are determined for each of the images.

In step S310 the specularity separation logic 206 determines specular image component values for each of the images by subtracting the diffuse image component values for the image from the image values at the sample positions of the texture. Therefore, the specular image component values for the reference image are given by $C_r^s(x)=C_r(x)-C_r^d(x)$.

The diffuse image components, $C^d(x)$, for the images are outputted from the specularity separation logic 206 and provided to the projective texturing logic 210 of the intrinsic colour component determining logic 224. The intrinsic colour determining logic 224 uses the diffuse image component values to determine an intrinsic colour component (i.e. an albedo) for a relightable texture as described below. The specular image components, $C^s(x)$, for the images are outputted from the specularity separation logic 206 and provided to the specular radiance estimation logic 208.

In step S312 the projective texturing logic projectively textures the geometry using the diffuse image component values from each of the images. The diffuse images have already been projected onto the geometry (in step S306), such that they have image values at the sample positions of the texture, and in step S312 the projected diffuse image components are combined to form a texture, $T(x)$. Techniques for combining image values to form a texture are known in the art.

The texture $T(x)$ is provided from the projective texturing logic 210 to the scene lighting estimation logic 212 and to the shading estimation logic 214.

In step S314 the scene lighting estimation logic 212 uses the texture $T(x)$ (which is formed from the diffuse image components values of the images) to determine a lighting estimate for the scene. Then in step S316 the shading estimation logic 214 uses the lighting estimate to separate the texture (which is formed from the diffuse image components values of the images) into an intrinsic colour component $\rho(x)$ of a relightable texture and a surface shading estimate S(x) for each of the sample positions of the texture. The way in which steps S314 and S316 are performed may vary in different implementations. Details of one way in which these steps may be performed are provided below.

First, some theory is explained which will be useful for the examples described below. Equation 3 below gives the irradiance I(x) (shading) at a sample position x on the surface of an object, according to the Lambertian appearance model:

$$I(x) = \int_\Omega B(x,\omega)R(\omega))d\Omega, \quad (3)$$

where $$T(x) = \rho(x)I(x), \quad (4)$$

$$B(x,\omega) = V(x,\omega)\max(0,\omega^T n(x)), \quad (5)$$

and where $R(\omega)$ is the radiance function and $B(x, \omega)$ is a function describing the local occlusion and foreshortening at a sample position, $V(x, \omega)$ is a binary visibility mask at sample position x and viewing direction $\omega$, and $\max(0, \omega^T n(x))$ accounts for the dependence of received energy on angle of incidence. $n(x)$ is the surface normal at the sample position x. The integral is over the surface of the sphere $\Omega$. $T(x)$ is the appearance at x and $\rho(x)$ is the albedo at sample position x.

Two types of shadows are treated differently in the examples described herein: attached shadows and cast shadows. An "attached shadow" is present at a sample position on the geometry due to the dot product between the surface normal at the sample position and the lighting direction, but an "attached shadow" does not take local occlusion into account. A "cast shadow" is present at a sample position on the geometry due to another part of the geometry being between it and the light source. Accurate estimation of $\rho(x)$ uses an estimate of the scene radiance $R(x)$ which is estimated concurrently. This is solved in two stages. First, the texture $T(x)$ is segmented into regions of similar appearance, and the attached shadow processing logic 213 obtains a coarse albedo estimate $\rho_c(x)$ based upon the initial segmentation by neglecting the visibility term $V(x, \omega)$ in Equation 5 and dealing directly with a global irradiance estimate. In a second stage, the cast shadow processing logic 215 uses the albedo estimate $\rho_c(x)$ to initialise a full radiance estimate taking visibility into account.

So in the first stage, ignoring visibility, the following equation for global irradiance is obtained:

$$I_G(n) = \int_\Omega \max(0, \omega^T n)R(\omega)d\Omega \quad (6)$$

The dependence on sample position x has been removed, allowing the global irradiance function $I_G(n)$ to be treated as a function over the sphere, sampled at each sample position on the surface by surface normal. $I_G(n)$ is a convolution of $R(\omega)$ with the clamped-cosine kernel $\max(0, \omega^T n)$. The problem of estimating irradiance at each sample position x on the surface has now been simplified to one of finding this global irradiance function.

In an example, the texture $T(x)$ is initially segmented in the mesh tangent space of the geometry into a number of regions of similar appearance, each of which is assigned a preliminary albedo estimate. Points on a surface of the geometry with similar surface normals should be lit similarly, and this concept can be used to perform albedo balancing of the intrinsic colour components of the segments of the texture. Segmenting the texture $T(x)$ and assigning per-segment albedos for subsequent refinement is an efficient way of initialising the albedos. An "albedo" may also be referred to herein as an "intrinsic colour component". Methods for segmenting a texture into regions of similar appearance are known to those skilled in the art. For each segment u in the segmentation U, the attached shadow processing logic 213 finds an initial albedo estimate $a'_u$ by averaging the texel values in that segment. That is, the initial albedo estimate $a'_u$ for the segment u is given by:

$$a'_u = \frac{1}{|u|}\sum_{x \in u} T(x) \; \forall u \in U \quad (7)$$

The ambiguity between irradiance and shading for each segment is resolved using the fact that shading is strongly correlated with surface normal direction, and irradiance varies slowly across the surface. In this way, a coarse, segment-based albedo estimate $\rho_c$ can be recovered from a single frame. A globally-optimal, closed-form solution to the problem of albedo balancing for a static scene is achieved by estimating a global irradiance function, which will subsequently be refined (by the cast shadow processing logic 215) to take local occlusion into account.

In the case of monochromatic lighting, the initial estimate of segment albedo $a'_u$ is a scaled version of the final albedo $a_u$, so that $k_u a_u = a'_u$. The problem of finding the correct ratios of segment albedos $a_u$ is equivalent to determining the multipliers $k_u$. This can be repeated for each colour channel in the case of general scene lighting.

An initial per-segment shading estimate $S_u(x)$ is given by:

$$S_u(x) = \frac{T(x)}{a'_u} \quad (8)$$

Making use of the fact that the low-frequency shading can be considered as samples of the irradiance function, $S_u(x)$ can be projected along the coarse surface normal $n_c(x)$ provided by the MVS scene reconstruction to give an estimate $I'_u(n_c)$ of the global irradiance function $I_G(n_c)$ at that sample position, such that:

$$I_G(n_c(x)) \approx k_u I'_u(n_c(x)) = k_u S_u(x) \quad (9)$$

The sum of squared error in the overlap between the local irradiance estimates $I'_u$ is minimised by appropriate choices of $k_u$. For two materials i,j $\in$U, let $Q_{i,j}$ be the binary support function giving the overlap between $I'_i$ and $I'_j$. The sum of squared error is given by:

$$E = \Sigma_i \Sigma_{j>i} [\int_\Omega (k_i I'_i(\theta,\phi) - k_j I'_j(\theta,\phi))Q_{i,j}d\Omega] \quad (10)$$

$$E = \Sigma_i \Sigma_{j<i} [k_i g_{ij} - k_j g_{ji}]^2 \quad (11)$$

where $$g_{ij} = \int_\Omega I'_i(\theta,\phi)Q_{i,j}d\Omega. \quad (12)$$

Iterative refinement of equation 10 can be avoided by finding a globally optimal k which corresponds to the null-space of a matrix G, defined as:

$$\frac{\partial E}{\partial k_{i_0}} = 2\sum_{i \neq i_0}(k_{i_0}g_{i_0 i} - k_i g_{ii_0})g_{i_0 i} = 0 \quad (13)$$

$$k_{i_0}\sum_{i \neq i_0} g_{i_0 i}^2 - \sum_{i \neq i_0} g_{ii_0}g_{i_0 i}k_i = 0 \quad (14)$$

$$G = \begin{pmatrix} \sum_{i \neq 1} g_{1i}^2 & -g_{12}g_{21} & \cdots & -g_{1n}g_{n1} \\ -g_{21}g_{12} & \sum_{i \neq 2} g_{2i}^2 & \cdots & -g_{2n}g_{n2} \\ \vdots & \vdots & \ddots & \vdots \\ -g_{n1}g_{1n} & -g_{n2}g_{2n} & \cdots & \sum_{i \neq n} g_{ni}^2 \end{pmatrix} \quad (15)$$

where k is a non-zero vector with $k_i > 0$ $\forall i$ such that $Gk=0$. As an example, Singular Component Analysis (which may be referred to as "SVD") may be applied to G, wherein k is the right singular vector with a corresponding singular value of zero. k is scaled so that the elements lie in the range $0 < k_i \leq 1$. This approach finds the global optimum of the cost function in a single step and does not suffer from slow convergence or local minima.

These multipliers are applied to the initial albedo estimates, to provide the globally balanced coarse albedo $\rho_c(x)$. It should be noted that this method is suited for use with smooth meshes, since it relies on overlaps between per-segment lighting estimates. For example, it gives good results for human actors, but it would degrade for angular man-made objects.

The method described above, performed by the attached shadow processing logic 213 accounts for "attached" shadows in the scene (i.e. a sample position on the geometry being in shadow due to the dot product between the surface normal at the sample position and the lighting direction), but does not take local occlusion into account, so does not remove "cast" shadows (i.e. a sample position on the geometry being in shadow due to another part of the geometry being between it and the light source). A method is now described that jointly estimates cast shadows with radiance.

The cast shadow processing logic 215 determines local irradiance estimates for the scene. The global irradiance estimate for the scene determined by the attached shadow processing logic 213 is a function of surface normal. It is noted that the global irradiance estimate may be denoised by fitting second order spherical harmonics to the global irradiance estimate. The cast shadow processing logic 215 uses the global irradiance estimate for the scene with scene geometry to determine local irradiance estimates at respective sample positions in the scene. In order to do this, initial estimates for the irradiance at respective sample positions are made based on the global irradiance estimate and the surface normal at the respective sample positions. These initial irradiance estimates do not take account of local occlusion in the scene. The cast shadow processing logic 215 can then use the scene geometry to take account of local occlusion in the scene in order to determine local irradiance estimates at the sample positions, as described below.

For example, initial irradiance estimates can be obtained based on the globally balanced coarse albedo $\rho_c(x)$ determined by the attached shadow processing logic 213. In particular, I(x) represents the irradiance (the total incident radiation) at a sample position x on the surface. This is approximated from T and $\rho_c$ as $I(x) \approx T(x)/\rho_c(x)$. This estimate will be used to find the global radiance function $R(\omega)$, which is then used to update I(x) with the cast shadows. The cast shadow processing logic 215 also obtains visibility indications which indicate the visibility of the sample positions in the scene in dependence on viewing angle. Using the obtained initial irradiance estimates and the obtained visibility indications, the cast shadow processing logic 215 calculates an angle-dependent radiance estimate for the scene. The cast shadow processing logic 215 can then use this radiance estimate in conjunction with the visibility indications to determine local irradiance estimates at the sample positions. Having knowledge of the scene geometry allows the visibility indications to be determined and it is this knowledge which adds extra information to allow the initial irradiance estimate to be refined by calculating the radiance estimate from the initial irradiance estimates and then calculating the local irradiance estimates from the radiance estimate. The local irradiance estimates I(x) may be used to determine an intrinsic colour estimate $\rho_s(x)$ for the texture T(x) according to the equation:

$$\rho_s(x) = \frac{T(x)}{I(x)}.$$

A more detailed explanation of the operation of the cast shadow processing logic 215 is provided below.

To estimate the radiance function, a closed-form, least squares solution is found. This step is initialised using the albedo estimates determined as described above, and is not limited to dynamic scenes or to scenes with constant albedo. As functions over the sphere, both $R(\omega)$ and $B(x, \omega)$ in equation 3 above can be expressed in terms of the spherical harmonic basis $\{Y_k\}$:

$$I(x) = \int_\Omega (\Sigma_{k=1}^\infty b_{x,k} Y_k)(\Sigma_{k=1}^\infty r_k Y_k) d\Omega \quad (16)$$

where $B(x, \omega) = \Sigma_{k=1}^\infty b_{x,k} Y_k$ and $R(\omega) = \Sigma_{k=1}^\infty r_k Y_k$. By the orthonormality of the spherical harmonic basis, equation 16 simplifies to:

$$I(x) = \Sigma_{k=1}^\infty b_{x,k} r_k \quad (17)$$

which may be approximated by the partial sum up to the $K^{th}$ term as $\Sigma_{k=1}^\infty b_{x,k} r_k$.

The coefficients $r_k$ are to be determined, given I(x) and $b_{x,k}$. The initial irradiance estimates I(x) at the sample positions x may be used to form a vector $I_E$ of the initial irradiance values at each sample position. For a large set of points M on the surface, such that M>>K, this can be expressed as an energy functional $E(R_{SH})$ to be minimised:

$$E(R_{SH}) = |B_{SH} R_{SH} - I_E|_2^2 \quad (18)$$

where $R_{SH}$ is a vector of the spherical harmonic lighting coefficients $r_k$, and $B_{SH}$ is a matrix of the visibility coefficients $b_{x,k}$. The energy functional can be minimised using linear least squares. The minimiser $R_{SH}^*$ is given by:

$$R_{SH}^* = (B_{SH}^T B_{SH})^{-1} B_{SH}^T I_E \quad (19)$$

$B(x, \omega)$ is estimated at the mesh vertices by rendering a visibility map in polar projection at each vertex position x. This is projected onto the spherical harmonic basis functions to obtain the coefficients $b_{x,k}$.

$R_{SH}^*$ provides an estimate of the radiance which can be used in conjunction with visibility to take into account cast shadows. The accuracy of the radiance estimate is dependent on the level of occlusion in the scene; where the scene is entirely convex, reliable spherical harmonic (SH) reconstructions beyond the second order cannot be found, and indeed are not required for cast shadow removal. For scenes with moderate local occlusion, SH reconstructions of radiance up to the fourth order could be reliably obtained.

Since the motivation for lighting reconstruction is to model cast shadows, reconstructions up to the $14^{th}$ order spherical harmonics are used in an example. Although these reconstructions are physically unreliable, they yield accurate results for the local irradiance at occluded regions of the surface. It may be beneficial to use up to at least the $10^{th}$ order spherical harmonics since this provides an accurate reconstruction of the cast shadows. However, going beyond approximately the $16^{th}$ order spherical harmonics may encourage overfitting (similar to the Gibbs phenomenon), so in preferred examples reconstructions up to the $K^{th}$ order spherical harmonic are used where $10 \leq K \leq 16$. The constraint that the radiance estimate should be positive for all sample positions x is therefore relaxed, provided the local irradiance estimate obtained from it is positive for all x.

Any colour bias in the irradiance from inaccurate albedo estimation may be removed by setting the brightest point in the irradiance to white, and rebalancing the colour channels appropriately. Having estimated the scene lighting, the albedo estimate can be refined. The local irradiance at each vertex is given by $I(x) = \Sigma_{k=1}^{K} b_{x,k} r_k$, and is interpolated in each triangle to find the irradiance for each texel of the texture. An improved albedo (i.e. intrinsic colour component of the texture) $\rho_s(x)$ is obtained as $$\rho_s(x) = \frac{T(x)}{I(x)}.$$

However, the coarseness of the scene geometry may prevent completely accurate decomposition of the high frequencies of T into albedo and shading using the above method. For this reason, a fast, bilateral filter based intrinsic image method is introduced to remove high-frequency shading effects from $\rho_s(x)$, leaving only the albedo. The use of an adaptive FIR filter for intrinsic image extraction, rather than explicitly minimising an energy functional, simplifies the method and is efficient for application to textures.

An energy functional is used which, when minimised, gives a robust local decomposition of an image T into irradiance (shading) I and albedo (reflectance) $\rho$ (as shown in equation 20 below). The energy functional is efficiently minimised using a modified bilateral filter kernel.

$$E(\rho,I) = \Sigma_{x \in P}(\rho(x) - \Sigma_{y \in N(x)} w(x,y)\rho(y))^2 + \Sigma_{x \in P}(T(x)/I(x) - \rho(x))^2 \quad (20)$$

where:

$$w(x,y) = \text{Norm}(\cos^{-1}(\hat{T}(x)^T \hat{T}(y)), \sigma_{i1}^2) \times \text{Norm}(\text{luma}(T(x)) - \text{luma}(T(y)), \sigma_{i2}^2) \quad (21)$$

and $$\text{luma}(c) = [0.299 \; 0.587 \; 0.114]^T [c_R c_G c_B] \quad (22)$$

The ˆ operator when applied to a vector, as in equation 21, is used to signify a normalised version of the vector. Therefore the function $\cos^{-1}(\hat{T}(x)^T \hat{T}(y))$ is the inverse cosine of the dot product between vectors having a unit length in the directions of the colours of the texture at sample positions x and y. The inverse cosine of the dot product of two normalised vectors represents the angle between those two vectors, and it is noted that the colour similarity is a Gaussian over angle in RGB space between two colours, if we imagine those colours as vectors. N(x) is the local neighbourhood of pixel x, which will become the domain of the kernel in the FIR reformulation. P is the set of pixel positions, of which N(x) is a subset. $\text{Norm}(x, \sigma^2)$ is a normal distribution over x with variance $\sigma^2$. $c_R$, $c_G$ and $C_B$ are the red, green and blue components of the pixel c respectively. There ara two parts to equation 20. The first part "flattens out" regions of similar albedo when minimised, where similarity is defined by the weighting function in equation 21. The second part of equation 20 enforces the relationship $T(x) = \rho(x)I(x)$.

A similar result can be obtained by iteratively minimising the first part only, and updating I after each iteration as $I(x) = T(x)/\rho(x)$ (which is the method used in the examples described in detail herein) according to the equation:

$$\text{argmin}_\rho E(\rho) = \Sigma_{x \in P}(\rho(x) - \Sigma_{y \in N(x)} w(x,y)\rho(y))^2 \quad (23)$$

An update step to minimise equation 23 is given by equation 24 below. This has been shown to converge rapidly by experiment. In the intrinsic textures extracted by this method, only a single application was required since the shading frequencies are relatively high. The intrinsic colour component of $\rho$ is preserved between iterations, which is equivalent to enforcing $\hat{\rho} = \hat{T}$ whilst preserving the colour magnitude of each pixel of $\rho$.

$$\rho_{n+1}(x) = \Sigma_{y \in N(x)} w(x,y) \rho_n(y) \quad (24)$$

This FIR formulation can be written as a modified bilateral filter, as in equation 25 below. This introduces the chromaticity similarity term from equation 21 in addition to the conventional luma term.

The variances $\sigma_{i1}^2$ and $\sigma_{i2}^2$ adapt to the local region, and u ensures the filter weights sum to unity.

$$\rho_{n+1}(x) = \frac{1}{u} \int \rho_n(y) \text{Norm}(\cos^{-1}(\hat{T}(x)^T \hat{T}(y)), \sigma_{i1}^2) \times \quad (25)$$
$$\text{Norm}(\text{luma}(T(x)) - \text{luma}(T(y)), \sigma_{i2}^2) \text{Norm}(\|x-y\|_2, \sigma_w^2) dy$$

The rate of convergence and scale of shading features that can be detected depends on the choice of kernel size in equation 25. The high variances $\sigma_{i1}^2$ and $\sigma_{i2}^2$ associated with large kernels cause "bleeding" between disconnected regions with similar albedo. Larger kernels also take a long time to convolve with the image. As an example, 15×15 kernels may be used.

Instead of initialising with the original texture T, in the case of textures the albedo estimate $\rho_S$, for which global shading has been removed, is used instead. This produces a final shading texture $I_f$ and final intrinsic albedo texture $\rho_f$.

Figure 6:
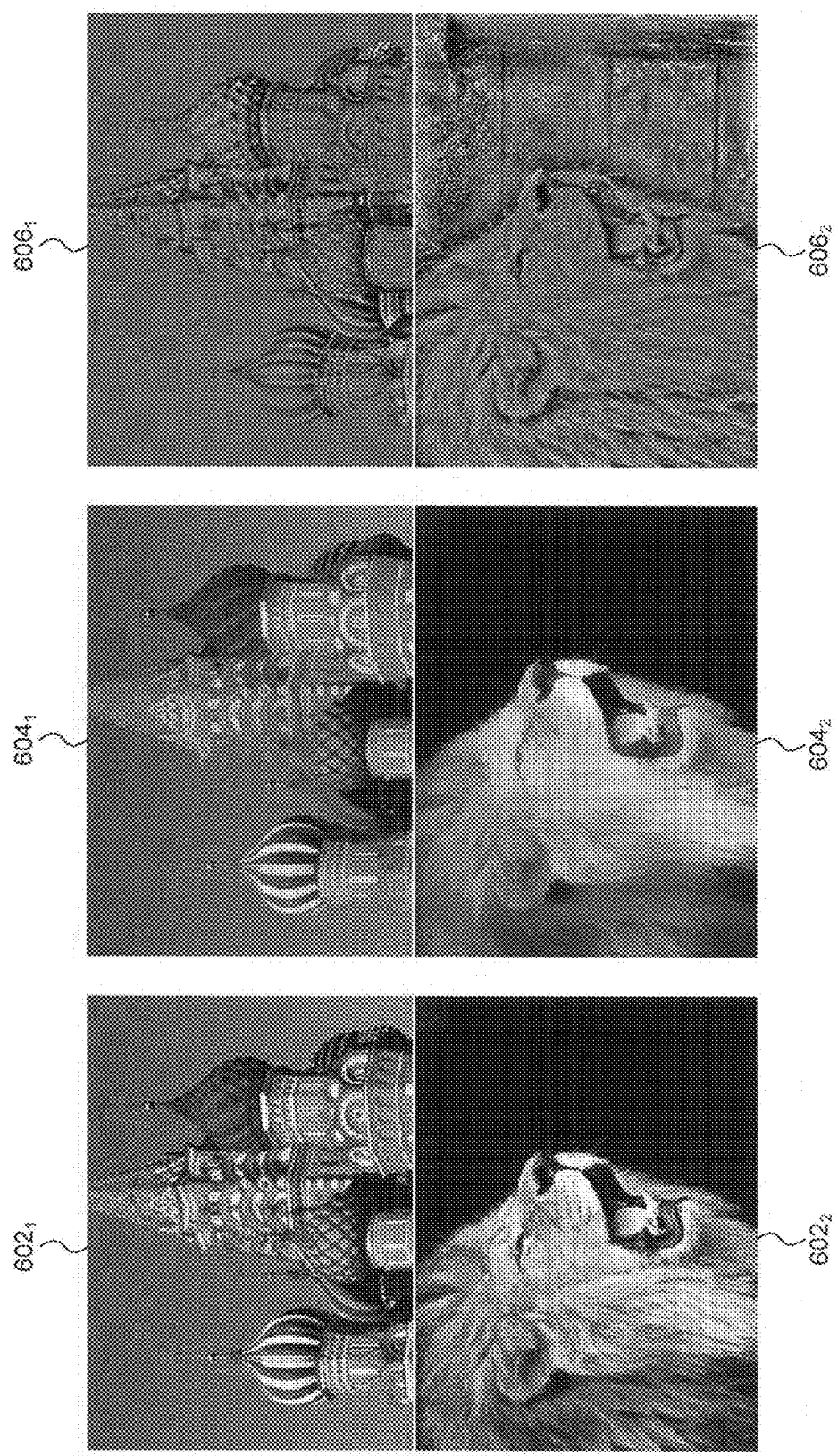
FIG. 6 shows two examples of the separation of an original image into a colour estimate and a shading estimate.

FIG. 6 shows two examples of separating an original image into an intrinsic colour estimate and a shading estimate. In the first example, the original image $602_1$ is separated into an intrinsic colour estimate $604_1$ and a shading estimate $606_1$. In the second example, the original image $602_2$ is separated into an intrinsic colour estimate $604_2$ and a shading estimate $606_2$. In both examples, it can be appreciated from FIG. 6 that the original image of the scene is separated into an intrinsic colour estimate ($604_1$ or $604_2$) whilst the lighting effects caused by the particular scene lighting of the captured images are separated out into a shading estimate ($606_1$ or $606_2$). By separating the intrinsic colour from the shading, the scene can be relit by applying a different lighting effect to the intrinsic colour estimates. In order to correctly apply a different lighting effect to the intrinsic colour estimate, the surface normals of the scene geometry are determined, as described below.

So, following step S316, the image value T(x) at each sample position x has been separated into an intrinsic colour component estimate $\rho(x)$ and a surface shading estimate S(x), such that $T(x) = \rho(x)S(x)$. The intrinsic colour component $\rho(x)$ of the texture can be stored in the store 228, and can be used subsequently to render an image of the scene from a rendering viewpoint under arbitrary lighting conditions.

The surface shading estimates S(x) are provided to the surface normal estimation logic 226. In particular, the surface shading estimates S(x) are provided to the first surface normal logic 216. In step S318 the surface normal estimation logic 226 determines surface normal estimates at the sample positions using the determined lighting estimate I(x) and the determined surface shading estimates S(x) for the sample positions. The surface normal determination of step S318 is described in more detail below with reference to the flow chart in FIG. 4. The determined surface normal estimates for sample positions (shown as $n_r(x)$ in FIG. 2) can be stored with the intrinsic colour component of the relightable texture in the store 228. The intrinsic colour component of the relightable texture combined with the surface normal estimates allow the scene to be rendered under lighting conditions which may be different to the lighting conditions under which the original images of the scene were captured.

As described above, the specularity separation logic 206 separates the diffuse image component values from the specular image component values, such that the diffuse image component values can be used to determine the intrinsic colour component estimates ρ(x) and the surface normal estimates $n_r(x)$. In some examples, the specular image component values are not used. However, in other examples, the optional step S320 is performed in which specular colour estimates $ρ_{spec}(x)$ are determined using the specular image component values $C^s(x)$. In order to do this, the specular radiance estimation logic 208 determines a radiance estimate using the determined specular image component values of the images $C_i^s(x)$.

For example, where prior knowledge is available of which regions of the surfaces of the geometry are specular (such as using a manual pre-segmentation), the specular images $C_i^s$ can be used to provide a high quality radiance estimate to aid albedo estimation. The direction to the light source $ω_{ls}$ for a given sample position x and viewing direction $ω_0$ is given by:

$$ω_{ls}=2(n_c^T ω_0)n_c - ω_0 \quad (26)$$

For each point in the specular image $C_i^s$ for which there is a specular highlight, a sample of the radiance function R(x) can be obtained. Where the coarse surface normal $n_c$ is inaccurate, there will be a certain amount of scattering of samples about their point of origin. The radiance samples are recovered using the reflected ray direction at sample point x, as $R'(ω_{ls})=C_i^s(x)$. This sparse set of samples is meshed and linearly interpolated to produce a full radiance estimate R'. This lighting reconstruction can be used in conjunction with the radiance estimate estimated by the scene lighting estimation logic 212 as described above. In this way, the radiance estimate R' may be used with the diffuse image component values to determine the intrinsic colour component of the relightable texture. Furthermore, the radiance estimate R' may be passed to the specular colour estimation logic 222 which uses it to estimate the specular colour component of the relightable texture, i.e. the specular albedo $ρ_{spec}(x)$. The specular colour component $ρ_{spec}(x)$ can be stored with the intrinsic colour component ρ(x) in the store 228, for use in subsequently rendering an image of the scene, although it is noted that the specular albedo $ρ_{spec}(x)$ is stored in a separate texture to the diffuse albedo ρ(x) within the store 228. The specular colour estimate logic 222 may use the surface normals $n_r(x)$ when determining the specular albedo $ρ_{spec}(x)$.

In step S322 the intrinsic colour component ρ(x) provided by the shading estimation logic 214, the surface normal estimates $n_r(x)$ provided by the surface normal estimation logic 226, and optionally the specular colour estimates $ρ_{spec}(x)$ provided by the specular colour estimation logic 222, are stored in the store 228 for subsequent use in rendering an image of the scene from a rendering viewpoint under arbitrary lighting conditions.

Figure 4:
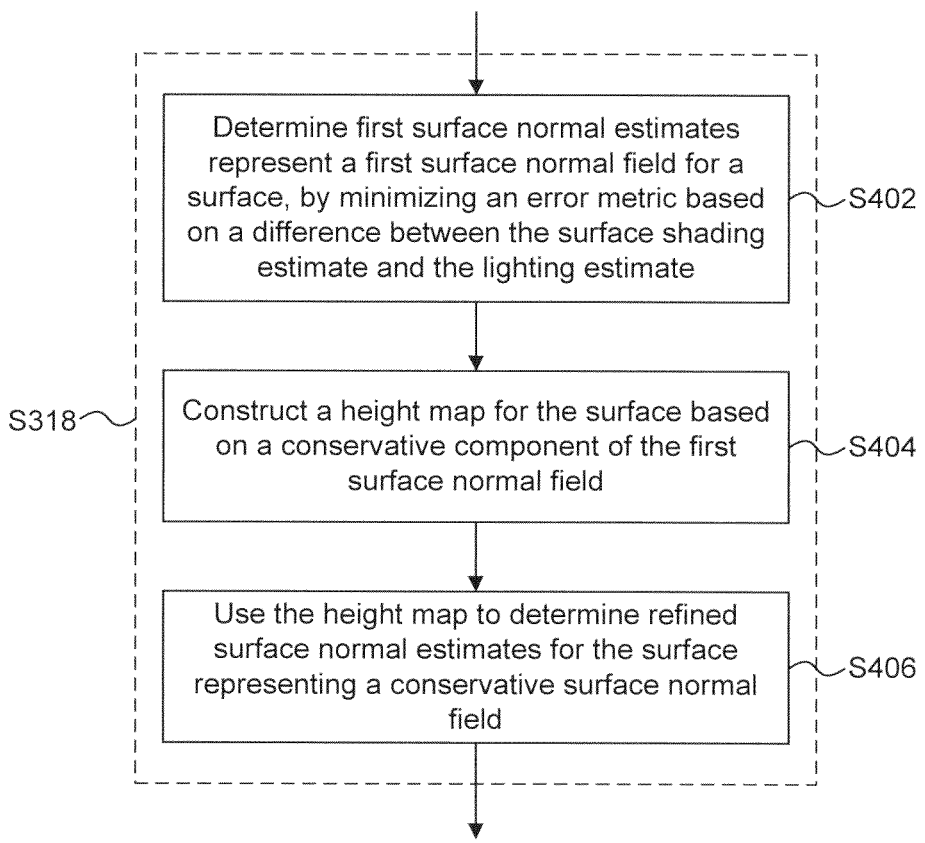
FIG. 4 shows a more detailed view of one of the steps of the flowchart shown in FIG. 3.

Details of the way in which the surface normal estimation logic 226 determines the estimates of the surface normals in step S318 are provided with reference to the flow chart shown in FIG. 4. It is noted that the surface normals for the "surface" of an object refer to the "visible surface" of the object, which may or may not include the whole surface of object, since it may or may not be the case that the whole of the surface of the object is in view of one or more of the cameras 104. However, it is noted that when MVS is used, there will be very little geometry which is not visible to at least one of the cameras 104.

The surface normal estimation is performed in two stages. In a first step, some surface normal estimates are obtained at the sample positions x on the surface of the object(s) in the geometry. In some examples these initial surface normal estimates may be provided to the surface normal estimation logic 226, but in the examples described in detail herein, these surface normal estimates are determined by the first surface normal logic 216. In particular, the first surface normal logic 216 determines the initial surface normal estimates $n_i(x)$ using the determined lighting estimate I(x) and the determined surface shading estimates S(x). The first surface normal logic 216 may also use the coarse surface normals $n_c(x)$ for the object(s) in the scene predicted form the geometry constructed for the scene.

The first surface normal logic 216 uses a per-texel approach to fit the surface normals $n_i(x)$ in the direction of greatest increase of the irradiance I(x) by optimising against the surface shading estimates of the texture S(x). The lack of dependency on neighbouring texels means that this can be done efficiently in parallel, e.g. using an OpenGL Shading Language (GLSL) fragment shader.

For example, the first surface normal logic 216 may determine the surface normal estimate $n_i(x)$ for a sample position x by finding the surface normal which minimizes an error metric E(n(x)) comprising a measure of the difference between the determined surface shading estimate S(x) for the sample position and the determined lighting estimate I(n) for the direction of the surface normal. The error metric further comprises a regularization term $Λ(n,n_c)$ which is a function of a difference between the surface normal n(x) for the sample position and a coarse surface normal $n_c(x)$ for the sample position predicted from the geometry. That is, the first surface normal logic 216 minimises E(n(x)) to determine n(x) using the global irradiance I(n), where E(n(x)) is given by the equation:

$$E(n(x))=\|S(x)-I(n)\|_1 + Λ(n,n_c) \quad (27)$$

The L1 norm is used in equation 27 because it is robust in the presence of noise. When fitting surface normals, the MVS reconstruction gives a good indication of likely surface normals. That is, large deviations of the fitted normals n(x) from the coarse normals $n_c(x)$ are unlikely and are therefore penalised using the regularisation term $Λ(n,n_c)$. The regularisation term $Λ(n,n_c)$ may for example be defined by the equation:

$$Λ(n, n_c) = \begin{cases} λ(\cos^{-1}(n^T n_c))^2 & n^T n_c > 0 \\ ∞ & \text{otherwise} \end{cases} \quad (28)$$

where λ is a parameter which may be determined experimentally. As an example, a value of λ=0.025 may be used.

Figure 7:
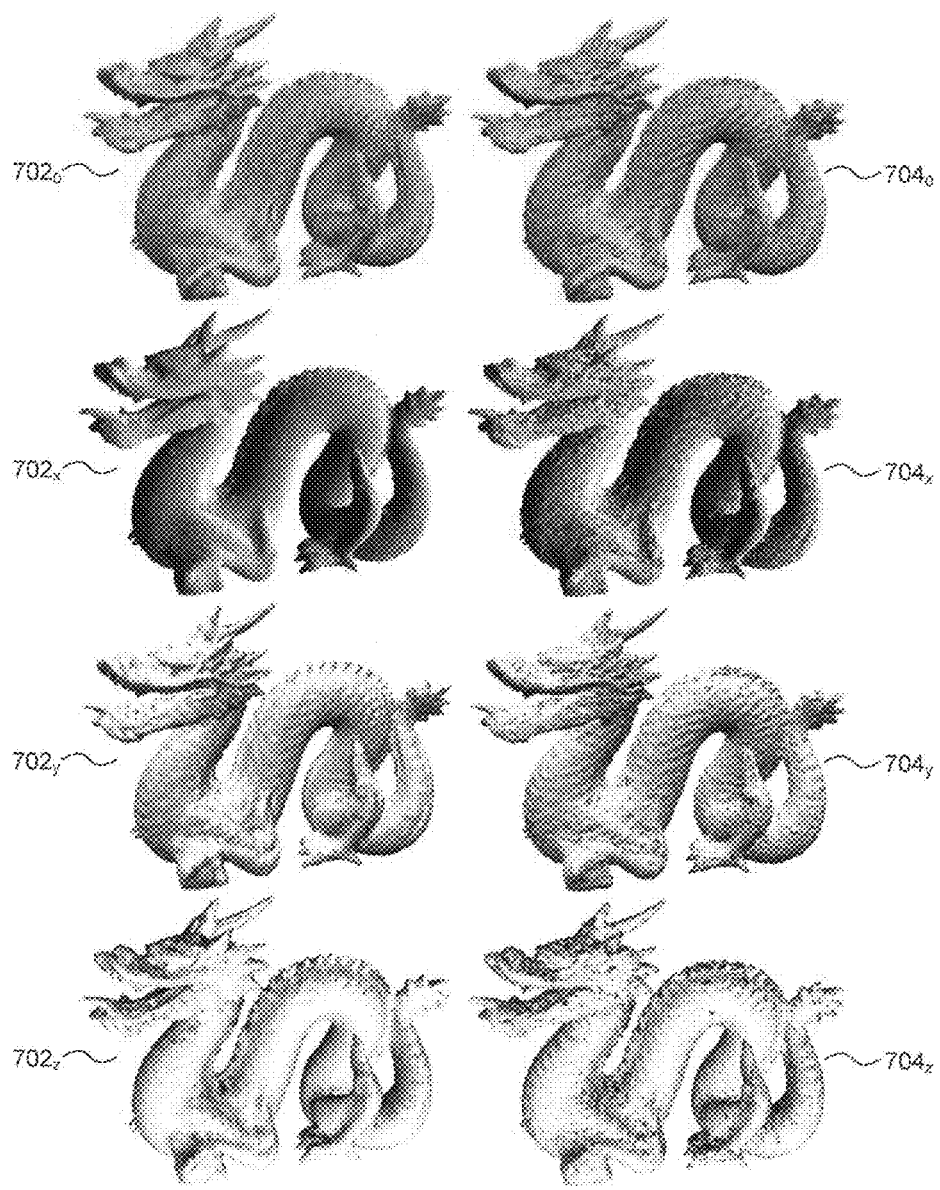
FIG. 7 shows an example of components of first surface normal estimates and components of refined surface normal estimates.

The surface normals determined by the first surface normal logic 216 are treated as "initial" surface normals $n_i(x)$. These surface normal estimates $n_i(x)$ represent a first surface normal field $N_i$. Since the initial surface normals $n_i(x)$ are determined independently of each other, there is no guarantee that they will actually represent a physical surface. That is, errors and/or ambiguities in the determination of the separate surface normal estimates $n_i(x)$ are likely to cause the first surface normal field $N_i$ to be a non-conservative field. For example, when fitting the surface normals to the shading texture, the surface normals can only be fitted in the direction of the gradient of the lighting estimate I(x), leaving the lateral component unchanged. For example FIG. 7 shows a representation 702$_O$ of the initial surface normals $n_i(x)$ determined for an object in the scene which is lit from above. The three representations below 702$_O$ show the x, y and z components of the surface normals $n_i(x)$ where the x-axis is horizontal, the y-axis is vertical and the z-axis is out of the page, such that the lighting is aligned with the y-axis. In particular, the representation 702$_x$ shows the x components of the surface normals $n_i(x)$, the representation 702$_y$ shows the y components of the surface normals $n_i(x)$, and the representation 702$_z$ shows the z components of the surface normals $n_i(x)$. It can be seen that the initial surface normal estimates contain little detail in the x and z directions, i.e. perpendicular to the direction of the lighting, but more detail in y direction, i.e. parallel to the direction of the lighting. Furthermore, the initial surface normal estimates may comprise some drift away from the average normal defined by the underlying low-frequency geometry.

It is noted that physical surfaces are associated with conservative surface normal fields. However, the first surface normal field $N_i$ may comprise a non-conservative component and a conservative component. That is, the first surface normal field $N_i$ is not constrained to be conservative, but it does have a conservative component. The conservative component of the first surface normal field $N_i$ may represent a physical surface, therefore if the conservative component of the first surface normal field $N_i$ can be determined then this may provide a more realistic estimation of the surface normals of the surface.

The initial surface normals $n_i(x)$ determined by the first surface normal logic 216 are provided to the height map construction logic 218. In step S404 the height map construction logic 218 constructs a height map for the surface of an object in the scene based on the conservative component of the first surface normal field $N_i$. A field is conservative if the curl of the field at all points is zero. The divergence of the first surface normal field $N_i$ can be used for constructing the height map so that the height map is constructed based on the conservative component of the first surface normal field $N_i$. Taking the divergence of the first surface normal field $N_i$ removes the non-conservative component because the divergence of the curl of any vector field (e.g. $\nabla \cdot (\nabla \times F)$) is zero regardless of the field F.

The surface normal estimation logic 226 determines refined surface normal estimates $n_r(x)$ representing a conservative surface normal field $N_r$. A conservative vector field can be represented as the gradient of a scalar field. Therefore, real-world surface normal fields should be an alternative representation of a height map, H, such that:

$$\nabla H = -N_r \qquad (29)$$

Since the divergence of the first surface normal field $N_i$ does not include the non-conservative components of the first surface normal field $N_i$, the following equation can be used:

$$\nabla \cdot (\nabla H) = -\nabla \cdot N_i \qquad (30)$$

The height map can then be constructed using a version of Poisson's equation. For example, an iterative relaxation method can be used to determine a height at each of the sample positions based on the heights at neighbouring sample positions and based on the divergence of the first surface normal field $N_i$. The "neighbouring" sample positions may for example be the nearest neighbours horizontally and vertically from a current sample position.

For example, on the $i^{th}$ iteration of the iterative relaxation method, the height $H_i(x,y)$ at a sample position (x, y) on the surface of the object may be given by:

$$H_i(x,y) = \tfrac{1}{4}\{H_{i-1}(x+\delta,y) + H_{i-1}(x+\delta,y) + H_{i-1}(x+\delta,y) + H_{i-1}(x+\delta,y) - \delta^2 \nabla \cdot N_i\} \qquad (31)$$

where δ is an interval between adjacent sample positions.

To prevent low-frequency biases in the surface normals from influencing the results, the relaxation method is terminated after a number of iterations such that the relaxation method terminates before convergence. For each iteration, the height value at a sample position takes account of more distant neighbours from the sample position. The number of iterations may be predetermined, and to give some examples may be 3 or 4. Alternatively, the height map construction logic 218 may control the number of iterations, e.g. based on an assessment of previous images which have been processed and whether low-frequency biases in the surface normals are influencing the results.

The height map is provided to the second surface normal logic 220. In step S406 the second surface normal logic 220 uses the height map H to determine refined surface normal estimates $n_r(x)$ at the sample positions on the surface of the object. As mentioned above, the refined surface normal estimates $n_r(x)$ represent a conservative surface normal field for the surface of the object in the scene. As described above, the gradients of the height map H can be determined to thereby determine the refined surface normal estimates $n_r(x)$, according to equation 29 given above. In this way the refined surface normal estimates $n_r(x)$ describe a conservative surface normal field $N_r$ which can represent a physical surface.

The initial surface normal estimates $n_i(x)$ are determined independently from each other. However, the use of the Poisson equation as described above brings a dependency between neighbouring surface normal estimates. In this way, the ambiguity in the surface normal direction perpendicular to the lighting direction can be at least partially resolved, resulting in refined surface normal estimates $n_r(x)$ which better describe physical surfaces. This is achieved by enforcing conservatism in the surface normal field.

For example FIG. 7 shows a representation 704$_O$ of the refined surface normals $n_r(x)$ determined for the same object as represented by 702$_O$, which is lit from above. The three representations below 704$_O$ show the x, y and z components of the surface normals $n_r(x)$. In particular, the representation 704$_x$ shows the x components of the surface normals $n_r(x)$, the representation 704$_y$ shows the y components of the surface normals $n_r(x)$, and the representation 704$_z$ shows the z components of the surface normals $n_r(x)$. It can be seen that the refined surface normal estimates $n_r(x)$ contain more detail than the initial surface normal estimates $n_i(x)$, particularly in the x and z directions, i.e. perpendicular to the direction of the lighting.

As described above, the refined surface normal estimates $n_r(x)$ are provided to the store 228 for storage therein, to be subsequently used for rendering an image of the scene, e.g. from a rendering viewpoint under arbitrary lighting conditions.

Figure 8:
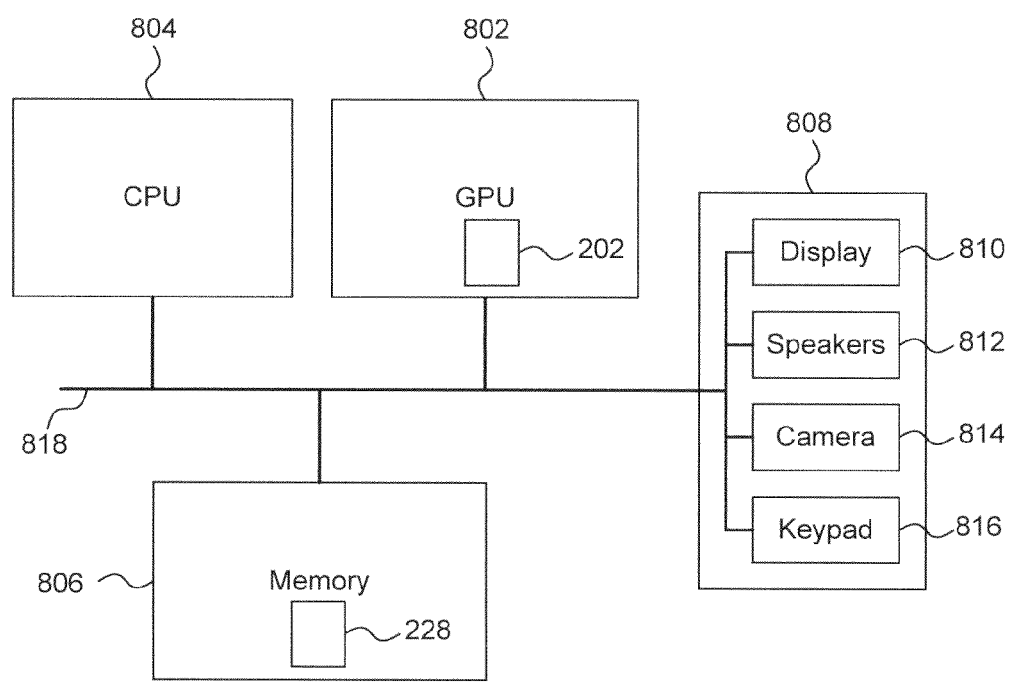
FIG. 8 shows a computer system in which an image processing system may be implemented.

The image processing system 200 may be implemented in a computer system such as that shown in FIG. 8, which comprises a GPU 802, a CPU 804, a memory 806 and other devices 808, such as a display 810, speakers 812, a camera 814 and a keypad 816. The components of the computer system can communicate with each other via a communications bus 818. The processing block 202 may be implemented (e.g. in hardware) as part of the GPU 802 as shown in FIG. 8. Alternatively, the processing block may be implemented on the CPU 804. If the functionality of the processing block is implemented in software then the software may be stored as computer program code in the memory 806 and may be executed on a processing unit in the computer system (e.g. on the GPU 802 or the CPU 804), to thereby configure the hardware of the processing unit to perform the functionality of the processing block 202 as described herein. It is noted that the store 228 may be part of the memory 806.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof.

In the case of a software implementation, the module, functionality, block, component or logic represents program code that performs specified tasks when executed on a processor (e.g. one or more CPUs). In one example, the methods described may be performed by a computer configured with software of a computer program product in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, block or logic (e.g. the logic blocks 204 to 226 in the processing block 202) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, block, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing block configured to perform any of the methods described herein, or for generating a processing block comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of determining an intrinsic colour component of a relightable texture for a scene which includes specular components, wherein the relightable texture is represented as a 2D array, and wherein a plurality of images of the scene are captured from a respective plurality of camera viewpoints and projected onto geometry which represents objects in the scene, the method comprising:
   determining, at each of a plurality of the sample positions of the texture, a diffuse image component value, said determining comprising finding the minimum of the image values at the sample position from a set of a plurality of the images in which the sample position is visible, wherein said set of a plurality of the images includes only those images for which an angle between a surface normal at the sample position and a viewing direction of the camera viewpoint for the image is less than a threshold angle;

using the diffuse image component values to determine the intrinsic colour component of the relightable texture; and storing the intrinsic colour component of the relightable texture for subsequent use in rendering an image of the scene from a rendering viewpoint under arbitrary lighting conditions.

2. The method of claim 1 further comprising:

receiving the plurality of images of the scene which have been captured from a respective plurality of camera viewpoints;

analysing the images of the scene to construct the geometry representing the objects in the scene; and projecting the images onto the geometry.

3. The method of claim 2 wherein said projecting the images onto the geometry comprises warping at least one of the images such that the projected images are more closely aligned with each other.

4. The method of claim 2 further comprising performing colour calibration of the projected images to thereby reduce differences between the projected images.

5. The method of claim 1 wherein diffuse image component values are determined for each of the images, wherein for a particular image, the diffuse image component value at each of the sample positions is determined based on the minimum of the image values at the sample position from a set of images comprising the particular image and at least another one of the images which has visibility of the sample position.

6. The method of claim 5 wherein said particular image is captured from a particular camera viewpoint and wherein said at least another one of the images comprises a plurality of the images captured from camera viewpoints which are the nearest neighbours of the particular camera viewpoint.

7. The method of claim 5 further comprising, for each of the images, determining specular image component values by subtracting the diffuse image component values for the image from the image values at the sample positions of the texture.

8. The method of claim 7 further comprising determining a radiance estimate using the determined specular image component values of the images.

9. The method of claim 8 wherein the determined radiance estimate is:

(i) used with the diffuse image component values to determine the intrinsic colour component of the relightable texture, and/or (ii) used to estimate a specular colour component of the relightable texture.

10. The method of claim 1 wherein said using the diffuse image component values to determine the intrinsic colour component of the relightable texture comprises:

using the diffuse image component values to determine a lighting estimate for the scene; and using the determined lighting estimate to separate the diffuse image component values into the colour component of the relightable texture and a surface shading estimate for each of the sample positions of the texture.

11. The method of claim 10 further comprising:

determining surface normal estimates at the sample positions using the determined lighting estimate and the determined surface shading estimates for the respective sample positions; and storing the determined surface normal estimates with the intrinsic colour component of the relightable texture for subsequent use in rendering an image of the scene from a rendering viewpoint under arbitrary lighting conditions.

12. An image processing system configured to determine an intrinsic colour component of a relightable texture for a scene which includes specular components, wherein the relightable texture is represented as a 2D array, and wherein the image processing system is configured to use a plurality of images of the scene captured from a respective plurality of camera viewpoints and projected onto geometry which represents objects in the scene, the image processing system comprising:

specularity separation logic configured to determine, at each of a plurality of the sample positions of the texture, a diffuse image component value by finding the minimum of the image values at the sample position from a set of a plurality of the images in which the sample position is visible, wherein said set of a plurality of the images includes only those images for which an angle between a surface normal at the sample position and a viewing direction of the camera viewpoint for the image is less than a threshold angle;

intrinsic colour component determining logic configured to use the diffuse image component values to determine the intrinsic colour component of the relightable texture; and a store configured to store the intrinsic colour component of the relightable texture for subsequent use in rendering an image of the scene from a rendering viewpoint under arbitrary lighting conditions.

13. The image processing system of claim 12 wherein the image processing system is configured to receive the plurality of images of the scene which have been captured from a respective plurality of camera viewpoints, the image processing system further comprising:

scene analysis logic configured to: (i) analyse the images of the scene to construct the geometry representing the objects in the scene, and (ii) project the images onto the geometry.

14. The image processing system of claim 12 further comprising a camera configured to capture at least one of the images of the scene from a respective at least one of the camera viewpoints.

15. The image processing system of claim 12 wherein the specularity separation logic is configured to determine diffuse image component values for each of the images, and wherein the specularity separation logic is further configured to determine specular image component values, for each of the images, by subtracting the diffuse image component values for the image from the image values at the sample positions of the texture.

16. The image processing system of claim 15 further comprising:

specular radiance estimation logic configured to determine a radiance estimate using the determined specular image component values of the images; and specular colour estimation logic configured to use the determined radiance estimate to estimate a specular colour component of the relightable texture.

17. The image processing system of claim 12 wherein the intrinsic colour component determining logic comprises:

scene lighting estimation logic configured to use the diffuse image component values to determine a lighting estimate for the scene; and shading estimation logic configured to use the determined lighting estimate to separate the diffuse image component values into the intrinsic colour component of the relightable texture and a surface shading estimate for each of the sample positions of the texture;

and wherein the image processing system further comprises surface normal estimation logic configured to determine surface normal estimates at the sample positions using the determined lighting estimate and the determined surface shading estimates for the respective sample positions.

18. A non-transitory computer readable storage medium having encoded thereon computer readable code that causes a processor to either:

(i) determine an intrinsic colour component of a relightable texture for a scene which includes specular components, wherein the relightable texture is represented as a 2D array, and wherein a plurality of images of the scene are captured from a respective plurality of camera viewpoints and projected onto geometry which represents objects in the scene, by:

determining, at each of a plurality of the sample positions of the texture, a diffuse image component value by finding the minimum of the image values at the sample position from a set of a plurality of the images in which the sample position is visible, wherein said set of a plurality of the image values includes only those images for which an angle between a surface normal at the sample position and a viewing direction of the camera viewpoint for the image is less than a threshold angle;

using the diffuse image component values to determine the intrinsic colour component of the relightable texture; and storing the intrinsic colour component of the relightable texture for subsequent use in rendering an image of the scene from a rendering viewpoint under arbitrary lighting conditions; or (ii) generate a processing block configured to determine an intrinsic colour component of a relightable texture for a scene which includes specular components, wherein the relightable texture is represented as a 2D array, and wherein a plurality of images of the scene are captured from a respective plurality of camera viewpoints and projected onto geometry which represents objects in the scene, by:

determining, at each of a plurality of the sample positions of the texture, a diffuse image component value by finding the minimum of the image values at the sample position from a set of a plurality of the images;

using the diffuse image component values to determine the intrinsic colour component of the relightable texture; and storing the intrinsic colour component of the relightable texture for subsequent use in rendering an image of the scene from a rendering viewpoint under arbitrary lighting conditions.

* * * * *